United States Patent

Horz et al.

[11] Patent Number: 6,048,460
[45] Date of Patent: Apr. 11, 2000

[54] BIOLOGICAL METHOD OF TREATING SEWAGE CONTAINING HIGH CONCENTRATIONS OF SLUDGE

[75] Inventors: Wolfgang Horz, Hofheim; Friedhelm Zorn, Ebertshausen; Hans Lohe, Kronberg, all of Germany

[73] Assignee: Hoechst Research & Technology Deutschand GmbH & Co. KG, Frankfurt, Germany

[21] Appl. No.: 09/051,410

[22] PCT Filed: Oct. 4, 1996

[86] PCT No.: PCT/EP96/04326

§ 371 Date: Jun. 8, 1998

§ 102(e) Date: Jun. 8, 1998

[87] PCT Pub. No.: WO97/13726

PCT Pub. Date: Apr. 17, 1997

[30] Foreign Application Priority Data

Oct. 11, 1995 [DE] Germany ............... 195 37 698

[51] Int. Cl.[7] ............................................. C02F 3/20
[52] U.S. Cl. ........................... 210/620; 210/622; 210/623
[58] Field of Search ........................... 210/620, 621, 210/623, 622

[56] References Cited

U.S. PATENT DOCUMENTS

| 3,980,556 | 9/1976 | Besik . |
| 4,085,041 | 4/1978 | Fullerton et al. . |
| 4,430,225 | 2/1984 | Takamatsu et al. . |
| 4,443,337 | 4/1984 | Otani et al. . |

FOREIGN PATENT DOCUMENTS

| 0524376 | 1/1993 | European Pat. Off. . |
| 33 40 096 | 5/1985 | Germany . |
| 43 31 927 | 3/1994 | Germany . |
| 2057415 | 4/1981 | United Kingdom . |

OTHER PUBLICATIONS

Patent Abstracts of Japan No. 63310697 dated Dec. 4, 1989.

*Primary Examiner*—David A. Simmons
*Assistant Examiner*—Fred Prince
*Attorney, Agent, or Firm*—Frommer Lawrence & Haug LLP

[57] ABSTRACT

The invention relates to a process for the biological treatment of waste water, in which a mixture of activated sludge and waste water is treated with gas in an activation stage and the activated sludge is separated off from the treated waste water by flotation, wherein the concentration of the activated sludge in the activation stage is $\geq 6$ g/l and wherein the flotation is a pressure-relief flotation.

2 Claims, 1 Drawing Sheet

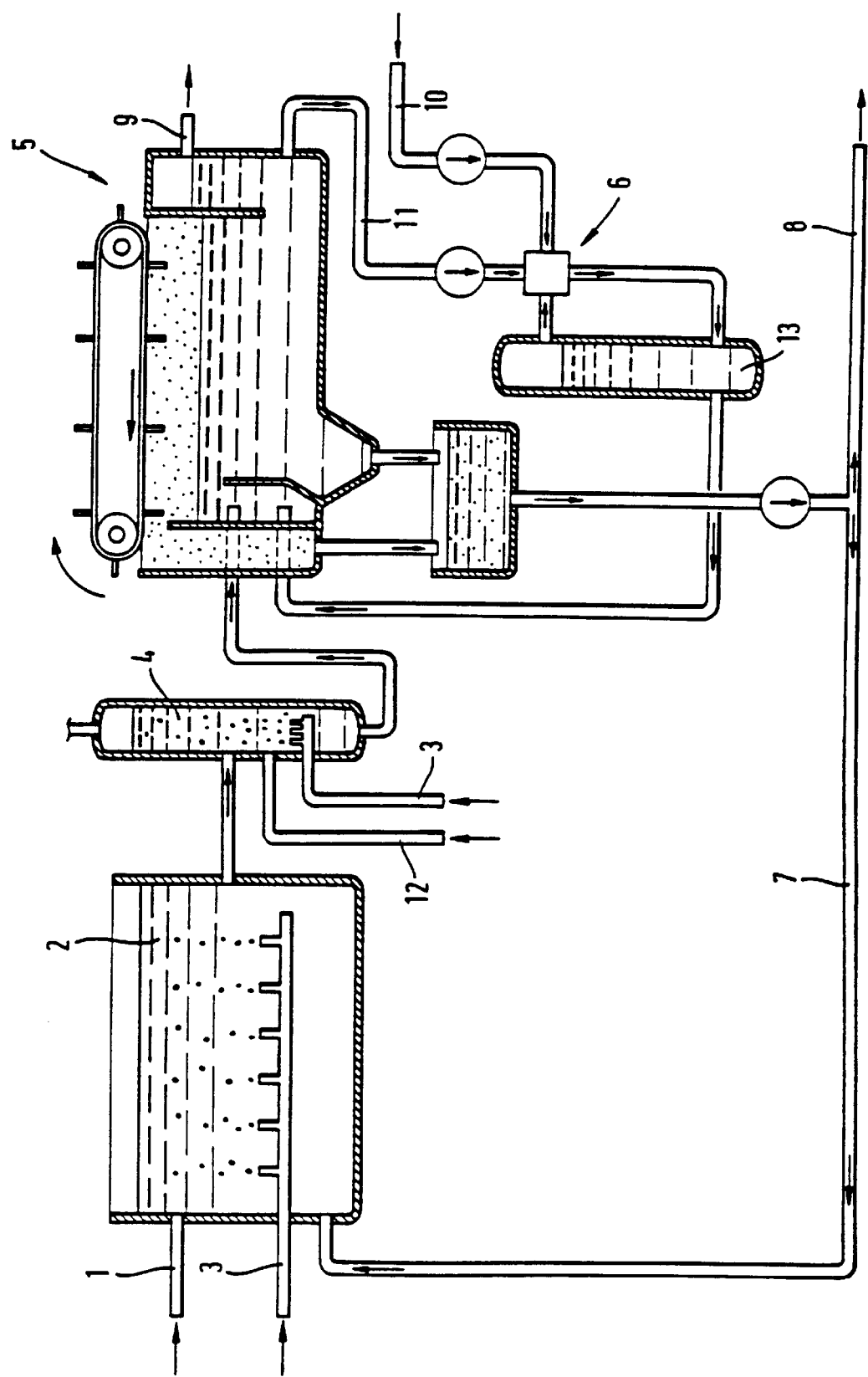

BIOLOGICAL METHOD OF TREATING SEWAGE CONTAINING HIGH CONCENTRATIONS OF SLUDGE

The invention relates to a process for the biological treatment of waste water, in which a mixture of activated sludge and waste water is treated with gas in an activation stage and the activated sludge is separated off from the treated waste water by flotation.

Processes of the said type have been disclosed, for example by German Patent Application P 44 11 991.7, which is herewith incorporated by reference. In a process of this type, the sludge leaves the activation stage together with the hydraulic load, the treated or purified waste water, and is separated off from the hydraulic load by flotation in a separation stage and in part recycled to the activation stage, in order to keep a defined sludge concentration in the activation stage. Because of this method of operation, there is a dependence between the sludge concentration in the activation stage and the sludge concentration in the efflux stream from the separation stage, which is recycled to the activation stage, the so-called return sludge. The sludge concentration in the activation stage is thus determined by the mixture of the recycled sludge and the virtually solids-free waste water. The sludge concentrations in the activation stage set in this manner are usually 5 g/l (cf. the abovementioned patent application). This sludge concentration is an important parameter in the dimensioning of biological waste water treatment plants, since it determines, inter alia, the volume of the activation reactor, the volume decreasing with increasing sludge concentration. Waste water treatment plants which could be operated at relatively high sludge concentrations would therefore be desirable, if they did not have some serious disadvantages. A disadvantage of such plants is that the flotation part, depending on the sludge concentration, must be made very large, and thus becomes correspondingly very expensive. Operating these flotation plants is, moreover, difficult, since they react very sensitively to changes in the waste water flow rate. Furthermore, the operating costs are very high, since the high water flow rate necessary for the flotation is a direct (proportional) function of the sludge concentration.

It has now surprisingly been found that these disadvantages are considerably reduced if a process of the type mentioned at the outset is modified in such a way that the concentration of the activated sludge in the activation stage is $\geq 6$ g/l and that the flotation is a pressure-relief flotation.

The invention therefore relates to a process for the biological treatment of waste water, in which a mixture of activated sludge and waste water is treated with gas in an activation stage and the activated sludge is separated off from the treated waste water by flotation, wherein the concentration of the activated sludge in the activation stage is $\geq 6$ g/l and wherein the flotation is a pressure-relief flotation. Preferred embodiments of the process according to the invention are given by claims 2 to 3.

BRIEF DESCRIPTION OF THE DRAWING

The Figure is a process flow diagram of an embodiment according to the invention.

A first preferred embodiment of the process according to the invention is that the concentration of the activated sludge in the activation stage is $\geq 8$ g/l, preferably $\geq 10$ g/l, particularly preferably $\geq 12$ g/l. A further preferred embodiment is that the suspension to be taken off for the flotation is conducted at a flow velocity $\geq 0.3$ m/sec against the natural direction of bubble rise, the suspension is additionally treated with gas in this case by means of a gas-treatment apparatus, the gas-treated suspension is taken off at the bottom of the gas-treatment apparatus and fed to the flotation as described, for example, in P 44 11 991.7.

Individual, or a plurality of, the individual features mentioned in the embodiments can also each be solutions of the invention per se, and the individual features can also be combined as desired.

The advantage of the process according to the invention is essentially that both the activation stage and the flotation stage of biological waste water treatment plants can be made smaller in comparison with conventional waste water treatment plants. This at the same time improves the efficiency and simplifies operation.

A possible embodiment of the process according to the invention is described in more detail below with reference to the process flow diagram shown in the figure.

A waste water 1 is mixed with an activated sludge termed return sludge 7 in an activation chamber 2 of an activation stage and aerated 3. In the course of this, the pollutants contained in the waste water are biodegraded. The mixture of sludge and water is then passed to a vertically upright downflow reactor 4. In this downflow reactor 4, which serves as a gas-treatment apparatus, the mixture of activated sludge and water is conducted downwards and aerated in the course of this. If necessary, a flocculating agent 12 may be added. The mixture of activated sludge and water is then taken off at the bottom of the downflow reactor 4 and fed to a flotation cell 5, in which the activated sludge is separated off from the water. This is reinforced by means of the fact that, in a pressurized water station 6, water and air 10 are brought to an elevated pressure and released into the flotation cell 5. The water used for this can be the purified waste water 11. A column 13 serves as stock or buffer tank. The activated sludge separated off is in part recycled as return sludge 7 to the activation chamber 2. The remainder is disposed of as excess sludge 8. The purified waste water is taken off as clarified water via an outlet.

The process of the invention is further explained on the basis of two working examples.

The examples relate to biological waste water treatment plants, in which the activated sludge is separated off by means of a pressure-relief flotation having an upstream downflow column as described above. Upstream of the biological treatment, the waste waters are subjected to preliminary clarification. The biomass which is established in each case for these specific waste waters did not show any significant change in degradation kinetics when the activated sludge concentration was increased. A limiting of the increase in solids content concentration with respect to the individual metabolic process for degrading the individual components in the waste water was taken into account.

In the individual examples, the volume of the activation chamber and the activated sludge concentration were varied.

Example 1:
Data on waste water characteristics and process characteristics:

| | |
|---|---|
| Waste water flow rate: | 30 m³/h |
| BOD₅ concentration: (biological oxygen demand) | 2 kg of BOB₅/m³ |
| COD concentration: (chemical oxygen demand) | 3.4 kg of COD/m³ |
| pH: | 6.8 |
| Return sludge concentration: | 40 g/l |
| BOD₅ concentration in the efflux: | <45 mg/l |
| Solids content in the efflux: | <50 mg/l |

Individual examples

| Activation volume (m³) | Activated sludge concentration in the activation chamber (g/l) |
|---|---|
| 611 | 6 |
| 488 | 8 |
| 412 | 10 |

Example 2
Data on waste water characteristics and process characteristics:

| | |
|---|---|
| Waste water flow rate: | 120 m³/h |
| BOD₅ concentration: | 2.2 kg of BOD₅/m³ |
| COD concentration: | 3.3 kg of COD/m³ |
| pH: | 7.1 |
| Return sludge concentration: | 50 g/l |
| BOD₅ concentration in the efflux: | <45 mg/l |
| Solids content in the efflux: | <50 mg/l |

Individual examples

| Activation volume (m³) | Activated sludge concentration in the activation chamber (g/l) |
|---|---|
| 1516 | 12 |
| 1366 | 14 |
| 1271 | 16 |

We claim:

1. A process for the treatment of waste water in a mixture comprising the waste water and sludge, which comprises, (a) treating the mixture with a first gas in an activation stage to from a suspension, comprising treated waste water and activated sludge, having a bubble rise in a first, natural direction therethrough, while maintaining said activated sludge in said activation stage at a concentration of at least $\geq 6$ g/l;

(b) subjecting said suspension to a pressure-relief flotation treatment at a flow velocity of $\leq 0.3$ m/sec against said first direction to separate said activated sludge from said treated waste water; and (c) additionally treating said suspension with a second gas by means of a gas-treatment apparatus to form a gas treated suspension which is subjected to said flotation treatment; wherein said gas treated suspension is taken off at the bottom of said gas-treatment apparatus and fed to the flotation.

2. the process as claimed in claim 1, wherein said concentretion of the activated sludge in said activation stage ranges up to $\geq 12$ g/l.

* * * * *